No. 775,536. Patented November 22, 1904.

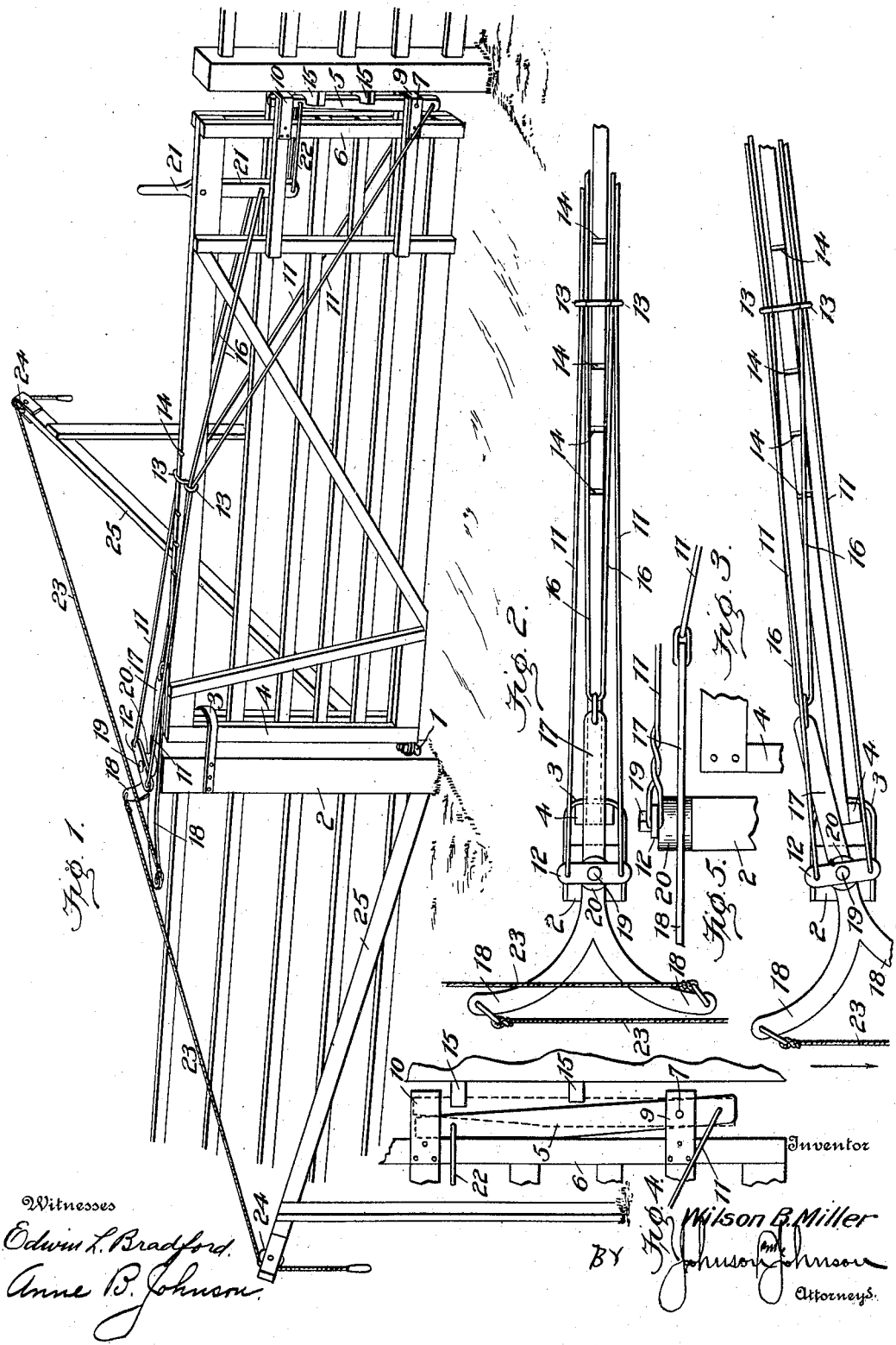

UNITED STATES PATENT OFFICE.

WILSON B. MILLER, OF McKENZIE, TENNESSEE.

FARM-GATE.

SPECIFICATION forming part of Letters Patent No. 775,536, dated November 22, 1904.

Application filed August 31, 1904. Serial No. 222,827. (No model.)

*To all whom it may concern:*

Be it known that I, WILSON B. MILLER, a citizen of the United States, residing at McKenzie, in the county of Carroll and State of Tennessee, have invented certain new and useful Improvements in Farm-Gates; and I do hereby declare the following to be a full, clear, and exact description of the invention, such as will enable others skilled in the art to which it appertains to make and use the same.

For swinging gates I have designed certain improvements in the operating connections whereby the gate is opened away from the person approaching it, and the particular features wherein my invention resides will be set out in the claims appended hereto in connection with the accompanying drawings, in which—

Figure 1 shows in perspective a gate embodying my improvement. Fig. 2 shows a portion of the gate in top view at its mounted end and in which the opening and closing devices are seen in their position when the gate is closed. Fig. 3 is a like view, the operating devices being in their position when the gate is being opened. Fig. 4 is a detail side view of the latch-wire connections. Fig. 5 is a detail side view of the latch-operating connections.

The frame of the gate is suitably braced to give it strength and rigidity. It is mounted to swing on a stud 1, secured to the gate-post 2 at the bottom of the gate, and is maintained in proper position by a yoke 3, secured to the top of the post and passed around the end bar 4 of the gate to keep the gate in true position at its mounted and at its latch ends with its mounting-stud and with its latch-post. At its swing end the gate has a latch-bar 5, pivotally mounted in vertical position at the outside of the end bar 6 and between the ends of bars 9 and 10, which for that purpose project from the end gate-bar, the pivot 7 being near the lower bar of the gate.

The gate is suspended by a wire 11, which is connected to the ends of a cross-bar 12, pivotally mounted on the upper end of the gate-post, and passing down on opposite sides of the gate is connected to the latch-bar 5 below its pivot 7. This wire 11 sustains the weight of the swinging end of the gate, being adjusted by means of a yoke or hanger 13, confined in a notch 14 on the upper gate-bar at a point about midway the length of the gate. This wire 11, therefore, is under constant strain with a pulling action on the lower end of the latch-bar, and thereby constantly forces its upper end toward the gate-post and when the gate is closed holds the latch-bar in engagement with the latch-blocks 15 on the post. The gate is opened and closed by a tri-armed lever pivotally mounted on the top of the post on which the gate is mounted and by a wire 16, connecting said lever to the upper end of the latch-bar. One arm, 17, of this lever overhangs the gate and is connected to said latch-opening wire 16, while the other lever-arms, 18 18, overhang the other side of said post 2 and have operating connections, as I will presently state.

I prefer to pivot the tri-armed lever and the cross-bar 12 on the same stud 19 with a ring-bearing 20 between them, so that the gate-operating lever 17 will be below the suspending-wires, as in Fig. 5, and the cross-bar 12 will be free to swing with the opening and closing of the gate, and thereby keep the cross-bar at right angles with the gate and both branches of the suspending-wire 11 under equal strain in the movements of the gate. The gate-opening wire 16, like the suspending-wire, passes along each side of the gate, and is connected to the lower end of a lever 21, pivoted to the top gate-bar near the latch end of the gate, which, depending therefrom, is connected at its lower end by a short wire 22 to the upper end of the latch-bar. It is important to note that the gate-operating wire passes freely through the same loops of the yoke or hanger 13 through which the gate-suspending wire passes and that the force of the lever to open and to close the gate is exerted on the lever-connected wire at the yoke, as in Fig. 3. This yoke and lever are the elements by which the latch-opening wire is caused to operate the gate, and this yoke forms a hold on which the wire is caused by the lever to have a sidewise pulling force to swing the gate in either direction. While the yoke-hinge 3 will hold the gate in true position upon its mounting-pivot and prevent the sagging of the latch end of the gate beyond the limit allowed by said yoke-hinge, the provision of the yoke 13 on the gate-bar will by its adjustment in notches on the gate-bar cause the swing end of the gate to be supported by the adjustable yoke, and thereby hold the latch-bar in position to engage the latch-blocks in closing the gate. The lever which unlatches and opens the gate is in its normal position between the gate-suspending wires and in a horizontal plane beneath them, so as to be freely moved beneath the suspending-wires in operating the gate. The pulling force of the lever is directly upon the upper end of the latch-bar and disengages it from the latch-blocks. To each of the lever-arms 18 18 is connected a cord 23 23, which passes over a pulley 24 on the end of a bar 25, which is secured to and extends from the gate-post on each side thereof, and it will be noted that each cord is connected to that arm 18 of the lever which stands on the opposite side of the fence, and this gives a long leverage to the lever in swinging the gate. I provide the two latch-blocks to give better fastening for the gate against the pushing of horses or cattle, and, looking at Fig. 4, it will be seen that when the latch-bar is pulled back to unlatch the gate the latch-bar will strike and pull against the gate-bar 6, and the pulling force of the lever is then transferred to the gate to pull it open in the way described.

I claim—

1. The combination with a swinging gate, a cross-bar pivotally mounted on the gate-post, a latch-bar pivoted near its lower end, a wire connecting the latch-bar below its pivot with each end of the cross-bar, a tri-armed lever pivoted on the gate-post, having one arm overhanging the gate, its other arms overhanging the gate-post, a wire connecting the lever-arm overhanging the gate with the upper end of the latch-bar, a yoke for suspending both latch-connected wires and means connecting the lever-arms overhanging the gate-post for operating the gate.

2. The combination with a swinging gate, a cross-bar pivotally mounted on the gate-post, a latch-bar pivoted near its lower end, a wire connecting the latch-bar below its pivot with each end of the cross-bar, a tri-armed lever having one arm overhanging the gate, its other arms overhanging the gate-post, a wire connecting the lever-arm overhanging the gate with the upper end of the latch-bar, the said cross-bar and the said lever mounted upon the same pivot and both said wires connected to the top gate-bar between their lever and latch-bar connections.

3. The combination with a gate, mounted to swing on its inner lower end, a yoke freely supporting its upper end, a cross-bar pivotally mounted on the gate-post, a latch-bar pivoted on the swing end of the gate, a wire connecting the ends of the cross-bar with the latch-bar below its pivot, a lever pivoted on the gate-post and overhanging the gate, a yoke or hanger on the upper gate-bar and a wire connecting the overhanging end of said lever with the upper end of said latch-bar both said wires freely passing through the hanger ends, and said lever transmitting power laterally to the hanger to release the latch and to swing open the gate, and means for operating said lever.

4. In a swinging gate and in combination, a vertical latch-bar, a lever pivoted on the gate-post and overhanging the gate, a wire connecting the overhanging end of said lever with the upper end of said latch-bar, a cross-bar pivoted on the gate-post, a wire connecting the ends of said cross-bar with the lower end of said latch-bar, a yoke or hanger on the upper gate-bar, both said wires passing on both sides of the gate and the said hanger forming a free support for both wires, and means for operating said lever.

In testimony whereof I have signed my name to this specification in the presence of two subscribing witnesses.

WILSON B. MILLER.

Witnesses:
J. W. CURTIS,
J. O. DINWIDDIE.